US012792439B2

(12) United States Patent
Tsai et al.

(10) Patent No.: US 12,792,439 B2
(45) Date of Patent: Nov. 10, 2026

(54) RESPONSIVENESS WHEN LOOPING ON SPECULATIVE ATOMIC MEMORY UPDATES

(71) Applicant: International Business Machines Corporation, Armonk, NY (US)

(72) Inventors: Aaron Tsai, Hyde Park, NY (US); Michael Fee, Cold Spring, NY (US); Jonathan Ting Hsieh, Poughkeepsie, NY (US); Yossi Shapira, Shoham (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/001,179

(22) Filed: Dec. 24, 2024

(65) Prior Publication Data

US 2026/0178430 A1 Jun. 25, 2026

(51) Int. Cl.
*G06F 11/00* (2006.01)
*G06F 11/07* (2006.01)

(52) U.S. Cl.
CPC ........ *G06F 11/076* (2013.01); *G06F 11/0772* (2013.01); *G06F 11/0793* (2013.01)

(58) Field of Classification Search
CPC . G06F 11/076; G06F 11/0772; G06F 11/0793
See application file for complete search history.

(56) References Cited

U.S. PATENT DOCUMENTS 4,847,754 A 7/1989 Obermarck et al.
10,565,117 B2 2/2020 Gschwind et al.
10,853,071 B2 12/2020 Mcneeney et al.
11,768,715 B1 9/2023 Eltantawy et al.
11,799,836 B2 10/2023 Borrill (Continued)

OTHER PUBLICATIONS

Authors et al.: Disclosed Without Attribution, "Method for Interlocking Multi-Phase Iterations of a Looping Invalidate Operation in a TLB Pipeline", An IP.com Prior Art Database Technical Disclosure, IP.com No. IPCOM000267301D, IP.com Electronic Publication Date: Oct. 14, 2021, 13 pages.

(Continued)

*Primary Examiner* — Michael Maskulinski
*Assistant Examiner* — Mathew Donald Gustafson
(74) *Attorney, Agent, or Firm* — Cantor Colburn LLP; Edward Wixted

(57) ABSTRACT

A present invention embodiment improves responsiveness when looping on speculative atomic memory updates. A conditionally atomic updating instruction is determined to have encountered a fail condition. A fail loop of the conditionally atomic updating instruction is determined to have occurred. In response to determining that the conditionally atomic updating instruction has encountered the fail condition and that the fail loop has occurred, a count that each cross-interrogation request (XI) instruction rejection contributes toward an XI rejection count that is compared to a threshold is increased. In response to the XI rejection count satisfying the threshold, performing a selfish store mitigation operation, wherein the selfish store mitigation operation blocks a thread or core responsible for the fail loop from inserting a new instruction into an instruction pipeline and flushes non-completed instructions of the thread or core from the instruction pipeline.

17 Claims, 5 Drawing Sheets

(56) References Cited

U.S. PATENT DOCUMENTS

| | | | | |
|---|---|---|---|---|
| 2013/0091331 | A1* | 4/2013 | Moraru | G06F 12/126 711/143 |
| 2019/0227839 | A1* | 7/2019 | Gschwind | G06F 9/3861 |
| 2023/0205523 | A1* | 6/2023 | Kalyanasundharam | G06F 9/30029 712/225 |
| 2024/0289282 | A1* | 8/2024 | Redshaw | G06F 12/0811 |
| 2025/0209007 | A1* | 6/2025 | Horsnell | G06F 12/0815 |

OTHER PUBLICATIONS

Authors et al.: Disclosed Without Attribution, "Method for Maintaining Efficient Sequencing of LARX/STCX Pairs", An IP.com Prior Art Database Technical Disclosure, IP.com No. IPCOM000267882D, IP.com Electronic Publication Date: Dec. 1, 2021, 4 pages.

Authors et al.: Disclosed Without Attribution, "Use of Transactional Memory for Limited Lists Without Locks", An IP.com Prior Art Database Technical Disclosure, IP.com No. IPCOM000245536D, IP.com Electronic Publication Date: Mar. 15, 2016, 6 pages.

Killat, M., "Lock-Free Programming For Real-Time Systems How Compare Exchange Will Become Your New Best Friend", Apex, AI, Meeting C++ 2021, 52 pages.

Lim, et al., "Swam: Revisiting Swap And Oomk For Improving Application Responsiveness On Mobile Devices", ACM Mobicom '23, Oct. 2-6, 2023, Madrid, Spain, arXiv:2306.08345v1 [cs.OS], 15 pages.

Reiher, P., "Operating System Principles: Mutual Exclusion And Asynchronous Completion", CS11 Operating Systems, Fall 2016, 48 pages.

* cited by examiner

RESPONSIVENESS WHEN LOOPING ON SPECULATIVE ATOMIC MEMORY UPDATES

BACKGROUND

1. Technical Field

Present invention embodiments relate to multiprocessing computing systems, and more specifically, to responding to looping of speculative atomic memory update instructions.

2. Discussion of the Related Art

In a multiprocessing computing system, some instructions can synchronize events across the processors. One type of synchronizing event performs a lock that permits only one core or thread to perform a particular task at a given time. This type of instruction may cause a core or thread to exclusively hold a memory location (e.g., a cache line) in anticipation of performing a store update to set the lock regardless of whether the core or thread is actually able to set the lock, which prevents the other cores or threads from accessing the memory location. This can create conditions in which the other cores or threads cannot make any progress until the exclusivity is removed. A common usage of these synchronizing instructions when they fail to acquire a lock is to immediately re-execute the instruction to try again to acquire the lock. Thus, when other cores or threads repeatedly attempt to access the exclusively-held memory location with one of these synchronizing instructions and fail to acquire the lock, a fail loop occurs and the other cores and threads tend to continue to hold the line exclusive, negatively impacting performance of the multiprocessing computer system.

SUMMARY

According to one embodiment of the present invention, a system is provided for improved responsiveness when looping on speculative atomic memory updates. A conditionally atomic updating instruction is determined to have encountered a fail condition. A fail loop of the conditionally atomic updating instruction is determined to have occurred. In response to determining that the conditionally atomic updating instruction has encountered the fail condition and that the fail loop has occurred, a count that each cross-interrogation request (XI) instruction rejection contributes toward an XI rejection count that is compared to a threshold is increased. In response to the XI rejection count satisfying the threshold, performing a selfish store mitigation operation, wherein the selfish store mitigation operation blocks a thread or core responsible for the fail loop from inserting a new instruction into an instruction pipeline and flushes non-completed instructions of the thread or core from the instruction pipeline. Embodiments of the present invention further include methods for improving responsiveness when looping on speculative atomic memory updates in substantially the same manner described above.

BRIEF DESCRIPTION OF THE DRAWINGS

Generally, like reference numerals in the various figures are utilized to designate like components.

DETAILED DESCRIPTION

Figure 1:
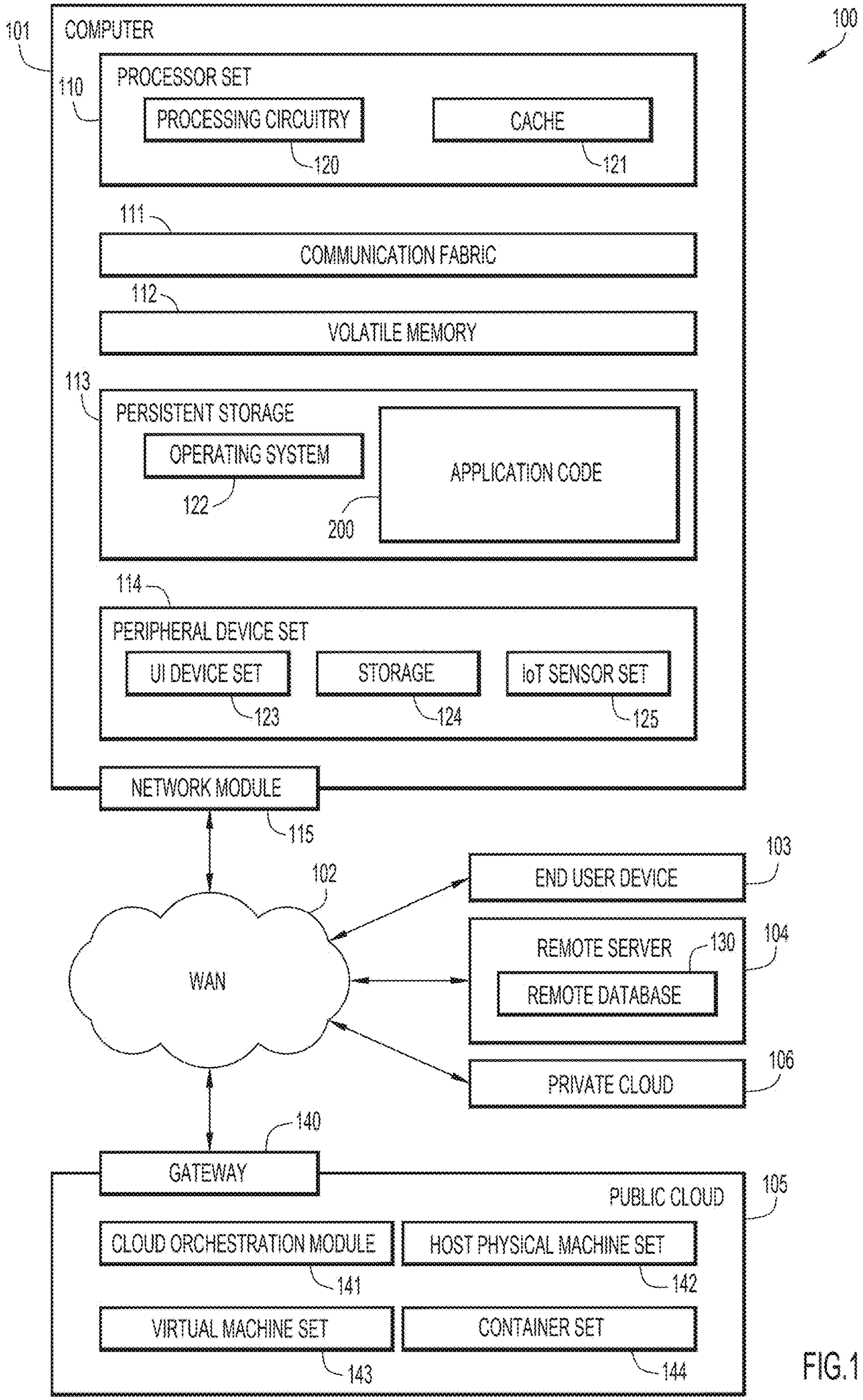
FIG. 1 is a diagrammatic illustration of an example computing environment according to an embodiment of the present invention.

A present invention embodiment relates to multiprocessing computing systems, and more specifically, to responding to looping of speculative atomic memory update instructions. One type of these instructions involves a synchronizing event in which a lock is enforced so that only one processor or thread can perform a particular task at a given time. In the case of a compare and swap (CS) instruction, a value of a location in memory is inspected to determine if it matches a lock value. If the value fetched from memory matches a lock value, then a new value is stored back into the same memory location that was inspected; if there is no match, the memory location is left as-is. A CS instruction thus involves a fetch, inspect/compare, and store (if there is a match), all of which are performed as a single atomic operation. Since a CS instruction is atomic, there cannot be an observed event (i.e., write/update) to the memory location in between these events.

When a CS instruction attempts to acquire a lock, and a "lock is free" value (e.g., zero) is found at the lock memory location by matching on a compare, a "lock is reserved" value (e.g., a non-zero value) is stored to the lock location. In many multiprocessing computing systems, it is commonly the case that when executing a CS instruction, there is not a high contention for the lock, and CS instructions typically find that the lock values is free. Optimizing for this case may involve configuring CS instructions to obtain a memory line in an exclusive state, rather than a read-only or shared state, which enables a processor or thread to immediately perform a store when a compare is successful.

Since the outcome of a compare is not known prior to executing a CS instruction, acquiring of the cache line as exclusive in order to perform the store is speculative. The CS instruction may also be referred to as a conditional instruction since the outcome (storing or not storing) is not known. In many implementations, when a processor or thread executes a storing or conditionally storing instruction, and holds a line as exclusive, any attempts by other processors or threads to remove exclusivity of the line, referred to as cross-interrogation (XI) requests, are rejected while the instruction is still executing. When a pipelined processor or thread is constantly storing to the same cache line such that there are always stores or conditional stores with overlapping execution in the pipeline, this is referred to as a selfish store condition and can create a deadlock where the other processors or threads can never access the line (as their XI requests are rejected each time). A conventional solution to this problem includes hardware for detecting when XI requests are being rejected, and when a threshold is reached, a selfish store mitigation action is performed where the hardware throttles the processor or thread that has the line as exclusive. In this way, the processor or thread holding the line exclusive will eventually be free of overlapping stores executing in the pipeline and will stop rejecting XI requests.

However, to ensure an acceptable minimal performance level for the processor or thread that has the line exclusive and needs to execute stores before the line is removed, it may require a relatively large amount of time for this to occur, negatively impacting performance as the other processors or threads cannot make forward progress as they are stalled repeatedly issuing XI requests that are rejected. In cases where the current processor or thread holding the line exclusive is performing necessary stores, there is a balance between allowing this core and thread to make progress versus other cores and threads that also need access to this line to make progress. However, in the case when a CS instruction is executing in a loop and repeatedly fails to match the store criterion and is holding the line exclusive and rejecting XIs due to speculating that it may store to the line, this processor or thread is stalling the other processors without actually needing the line exclusive since it is not storing, and without performing any meaningful work.

The embodiments presented herein address this problem by detecting when a CS instruction is failing and is likely in a loop in which the CS instruction repeatedly fails to match the value needed to complete the store. In response to this, a threshold for performing a selfish store mitigation action is more quickly satisfied in various ways. The selfish store mitigation action prevents the processor that is holding the line as exclusive, and repeatedly performing CS instructions that fail to store, from inserting new instructions into the pipeline. The threshold for performing a selfish store action can be achieved more quickly by adjusting the amount by which each XI rejection contributes to the threshold. For example, the amount may be doubled, so that half as many XI rejections are required to reach the threshold. Alternatively, the rate of XI requests may be increased so that there is an opportunity for more XI rejections over a given span of time, which also enables the threshold to be achieved in less time.

Present invention embodiments thus improve the technical field of computing by improving the performance of multiprocessing systems. By implementing these improvements into hardware, no software changes are required to modify the default speculative handling, such as modifying the software to perform lock-less solutions or checking the value of a lock prior to performing a CS instruction, which introduces an additional atomic operation. The embodiments presented herein provide several practical applications, including improving performance of multiprocessing systems and/or negating the need to recompile software to address CS instruction looping.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 contains an example of an environment for the execution of at least some of the computer code involved in performing the inventive methods, such as application code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
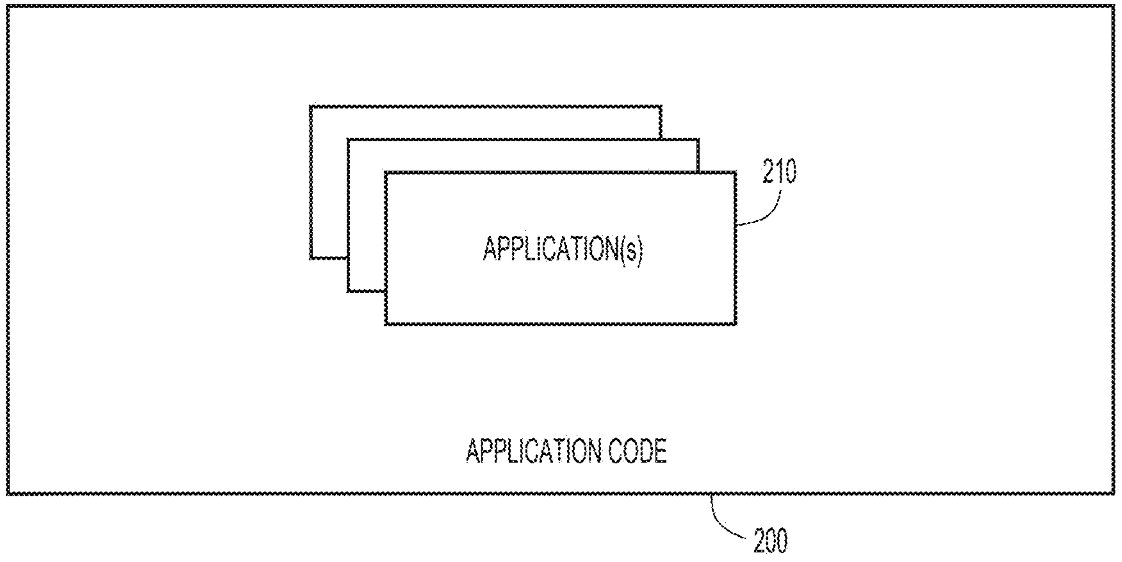
FIG. 2 is a block diagram of application code according to an embodiment of the present invention.

A block diagram of application code 200 according to an embodiment of the present invention is illustrated in FIG. 2. Specifically, application code 200 one or more applications 210. Each application 210 may include one or more modules or units to perform various functions of present invention embodiments described herein. Each application 210 may be implemented by any combination of any quantity of software and/or hardware modules or units, and may reside within volatile memory 112 of computer 101 for execution by a processor, such as processor set 110.

Application(s) 210 may include any software that is configured to be executed in a multiprocessor computing environment. Any of application(s) 210 may be configured to respond to speculative atomic memory updates, when encountered, in various ways. When executed, an application 210 may perform a CS loop response with no preceding test or check on the match condition in order to branch around the CS and avoid CS execution when there is no match in which logic is provided that breaks a deadlock as described herein by preventing a processor or thread from holding a line as exclusive after a certain amount of time or loops by stopping execution of the CS instruction. Alternatively, an application 210 may be configured to perform a load and test instruction prior to performing a CS instruction; this enables the match condition to be verified prior to executing the CS instruction (e.g., so that the CS instruction would no longer be speculative). In some embodiments, an application 210 may be configured to implement locks without using a CS instruction or can be configured to avoid using locks using a different mechanism for achieving coherence in a multiprocessing environment.

Figure 3:
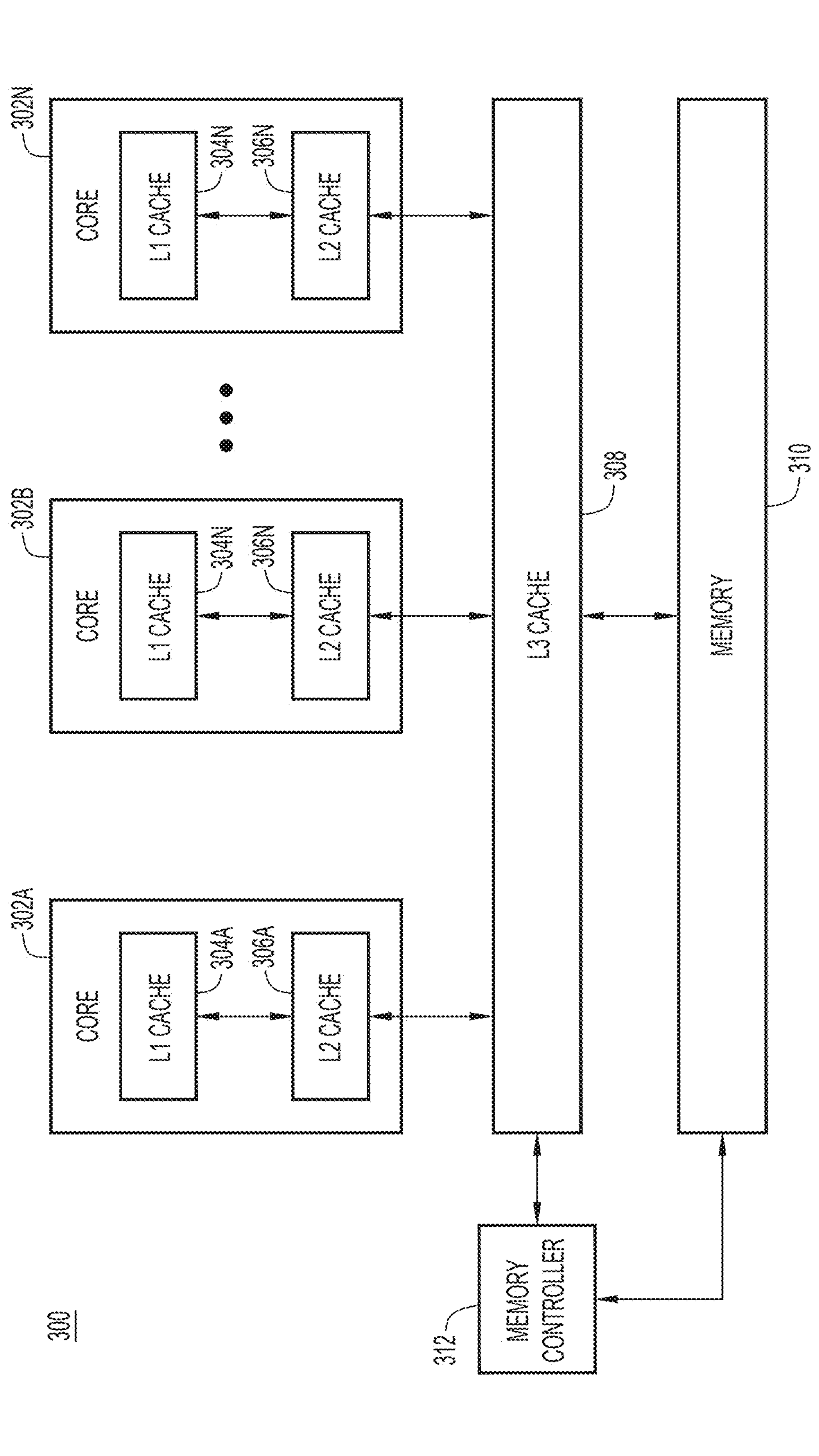
FIG. 3 is a block diagram of a multiprocessing computing environment according to an embodiment of the present invention.

With reference now to FIG. 3, a block diagram is provided of a multiprocessing computing environment 300 according to an embodiment of the present invention. As depicted, the multiprocessing computing environment 300 includes a plurality of cores 302A-302N, each of which may include an L1 cache 304A-304N and an L2 cache 306A-306N; multiprocessing computing environment 300 also includes an L3 cache 308, memory 310, and a memory controller 312.

Each core 302A-302N may represent a processor or thread of the multiprocessing computing environment 300. As such, each core 302A-302N may independently execute tasks such as fetching, decoding, and executing instructions. The cores 302A-302N may collectively operate to perform parallel processing, as an operating system or other application can distribute tasks among the cores 302A-302N. Each core may include one or more caches that are private to the core, such as an L1 cache (e.g., L1 cache 304A-304N) and an L2 cache (e.g., L2 cache 306A-306N), additionally, a shared cache may be provided (e.g., L3 cache 308). In some embodiments, an L1 cache may be smaller and faster than an L2 cache, which in turn is smaller and faster than an L3 cache. Memory 310 may be a volatile memory from which data is loaded into the L3 cache 308, and may correspond to volatile memory 112, as depicted and described with reference to FIG. 1. Memory controller 312 may manage the flow of data between memory 310 and cores 302A-302N by forwarding data from memory 310 to various caches and writing data back to memory 310.

A CS instruction successfully executes when a core obtains a cache line as exclusive, determines that the target memory location in the line matches a particular success value, and in response, a new value is written to the target memory location in the line by the core, which then releases exclusivity of the line. However, a CS fail loop can occur when a core does not obtain the success value and becomes stuck reattempting to perform the CS instruction. For example, core 302A may obtain exclusivity of a particular line whose value does not match, and since this is held exclusively, another core (e.g., core 302B) cannot change the value to end the loop (which would require core 302B to obtain the line as exclusive). An attempt by another core (e.g., core 302B) to obtain the line in the exclusive state would require an XI instruction to be sent to the core that has exclusivity of the line (e.g., core 302A). Since the core with the line the exclusive state will not give up exclusivity when there are pending CS instructions executing in the pipeline, such an XI instruction is rejected. The mechanism for this may be implemented using a store queue (STQ) and/or store buffer (STB), which is a data structure that tracks memory locations to which a CS instruction is writing a store or attempting to write a store. Thus, an entry is written to an STQ when there is a CS instruction in the pipeline for a particular core, and the entry indicates a location in memory to which the CS instruction would perform a store. The presence of such an entry in the STQ may reject any XI instruction from another core.

Thus, a CS fail loop occurs when a core has CS instructions in its pipeline that cannot be completed due to a no match condition of the inspected value, and the value cannot be changed as the core holds that line as exclusive, causing entries in the STQ to reject any XI attempts. A conventional solution to this problem is to prevent a core (e.g., core 302A) from continuing to hold a line as exclusive for too great of a duration or number of stores. When an XI instruction is rejected due to a line being exclusive, a count is increased and compared to a threshold, and if the threshold is satisfied, the core (e.g., core 302A) is eventually prevented from holding the line as exclusive. Specifically, a conventional approach may be that a threshold is attained after a number of XI rejections, and in response, a selfish store mitigation action is performed in which new CS instructions are rejected from the pipeline to prevent STQ entries from being entered that would block a subsequent XI instruction. Note that the conventional approach assumes that the core or thread that has the line exclusive is performing useful stores that are needed to make real progress, and there needs to be a balance between allowing the current core with the exclusive lines to perform its necessary stores versus other cores or threads that also need access to this line to make progress.

In contrast to conventional techniques, present invention embodiments detect when a core is in a CS fail loop by predicting that a core will repeatedly attempt CS instructions that will fail, and in response, removing the core's exclusivity of a line in a more responsive manner. In particular, a selfish store mitigation action by another core may be triggered more rapidly when conditions for a CS fail loop are met. In some embodiments, the count that each XI rejection contributes toward a threshold will be increased. For example, if each XI rejection counts as one point, and the threshold is set to ten, then ten XI rejections would be required for the selfish store action to be triggered. In contrast, when the conditions for an CS fail loop are detected, present embodiments may double the count of each XI rejection, so that only five XI rejections are required to occur. The increase of a count can be any increase, such as a twofold increase, threefold increase, non-integer increase (e.g., a 1.5× increase), and the like. This has the practical effect of increasing the weight of XI rejections toward satisfying a threshold, thereby causing a CS fail loop to be interrupted by a selfish store mitigation action more quickly. In another embodiment, the rate of XI requests may be increased, thereby causing the threshold to be achieved more quickly (as there are more counts toward the threshold over a smaller timespan).

In one embodiment, after a CS fail or probable CS fail is detected, and following this event, a XI reject is detected, a CS fail loop is determined to likely be in progress by observing that the XI reject is only due to STQ entries that are speculative and have not yet been confirmed to be executing actual stores actions. This CS fail loop determination is based on the fact that when we are in a CS fail loop for a significant duration, eventually the only valid STQ entries will be for speculative CS instructions that will always fail and we will never have STQ entries for storing instructions that are confirmed to be successfully storing.

In another embodiment, when a CS fail loop is detected, the core responsible for the loop may be forced to release exclusivity by a mechanism other than a selfish store mitigation action triggered by another core. In such embodiments, all new CS type instructions for the core may be rejected from entering the pipeline to prevent corresponding new STQ entries. This enables the completed stores to exit the STQ so that an incoming XI request may be accepted.

Figure 4:
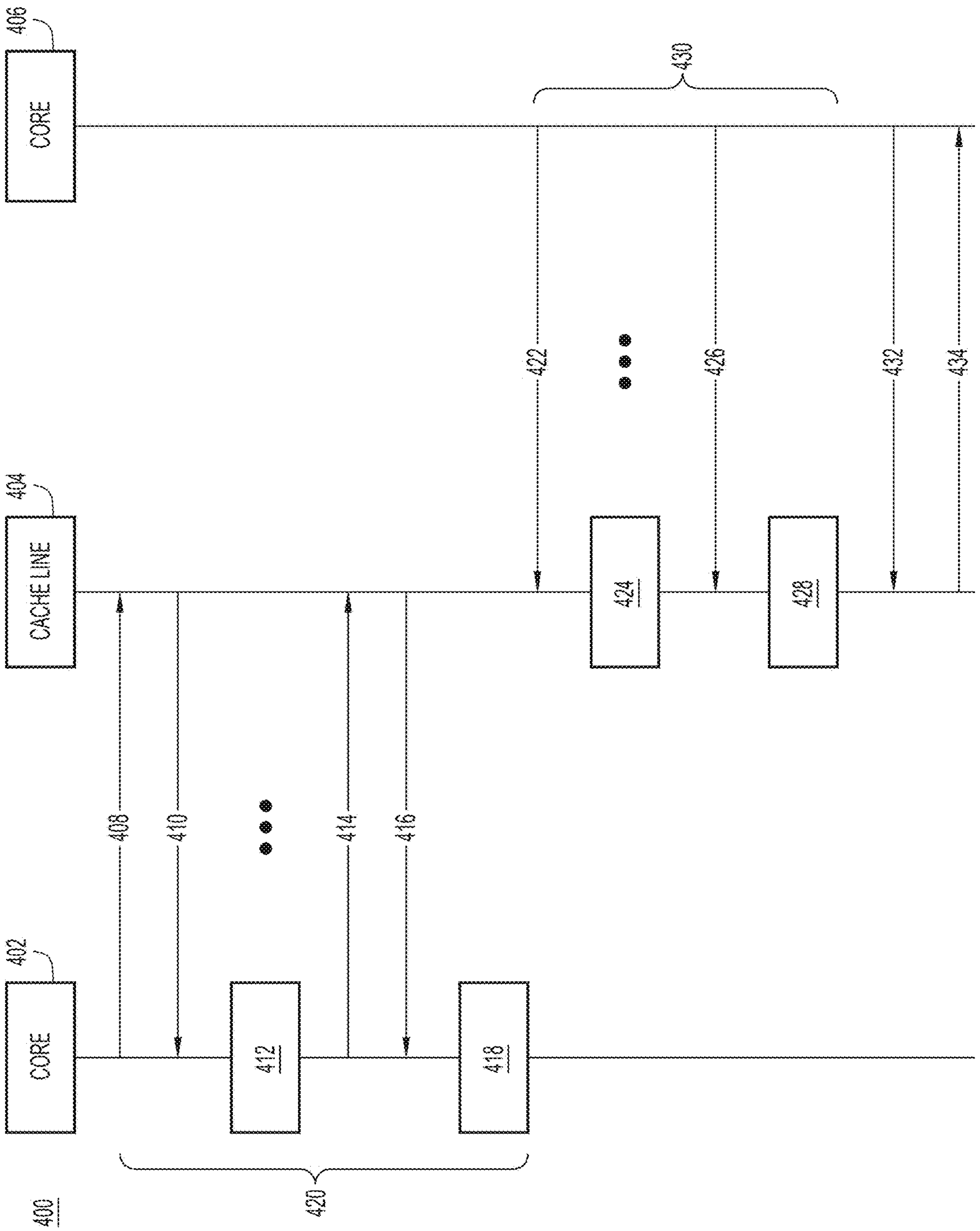
FIG. 4 is a flow diagram of a compare and swap fail loop response according to an embodiment of the present invention.

FIG. 4 is a flow diagram of a CS fail loop response 400 according to an embodiment of the present invention. As depicted, response 400 includes a core 402 that is responsible for the CS fail loop, the cache line 404 that is held exclusive by core 402, and another core 406.

Initially, core 402 receives in its pipeline a CS instruction or set of instructions that include a CS instruction. Core 402 executes the CS instruction by accessing cache line 404 at operation 308 to obtain a value at operation 410. At operation 412, core 402 compares this value to a known value to determine if the two values match, and if so, the CS instruction would store a new value to the location in memory that is held exclusive. However, in the depicted example, the values do not match. Additionally, when the CS instruction is executed, an entry in the STQ is provided that records the location in memory at which the speculative store was addressed. Since the presence of the entry in the STQ prevents another core (e.g., core 406) from obtaining the cache line 404 as exclusive, the value in the cache line that is used for the compare cannot be changed, meaning that a next CS instruction will also fail. The next CS instruction is represented at operations 414 and 416 (fetch) and the compare and failure to match is performed at operation 418. This CS fail loop, represented by operation group 420, may repeat multiple times; while the example of FIG. 4 only depicts two instances, it should be appreciated that the CS fail loop may continue until the conditions are met for preventing further CS fail conditions.

As the CS fail loop occurs, core 406 may attempt to acquire cache line 404 as exclusive based on the execution queue in its own pipeline. Thus, at operation 422, core 406 may issue an XI request, which is rejected at operation 424. This may repeatedly occur (as represented by operations 424 and 426). Each failure of the XI request contributes to a count that is compared against a threshold; the amount to which each individual XI request that is rejected contributes to the overall XI rejection count may be increased when a CS fail loop is detected. Thus, an XI rejection may contribute a normal value toward an overall XI rejection count in the case that the XI rejection occurs because CS instructions that are successfully storing block the XI rejection, whereas when CS instructions are not completing the store, and there is a CS fail loop, each XI rejection may contribute a higher-than-normal amount toward the overall XI rejection count (e.g., double, triple, etc.). XI rejections may occur repeatedly (as represented by operation group 430) until the overall XI rejection count satisfies a threshold, at which point a selfish store action may be performed to prevent core 402 from holding cache line 404 as exclusive.

Figure 5:
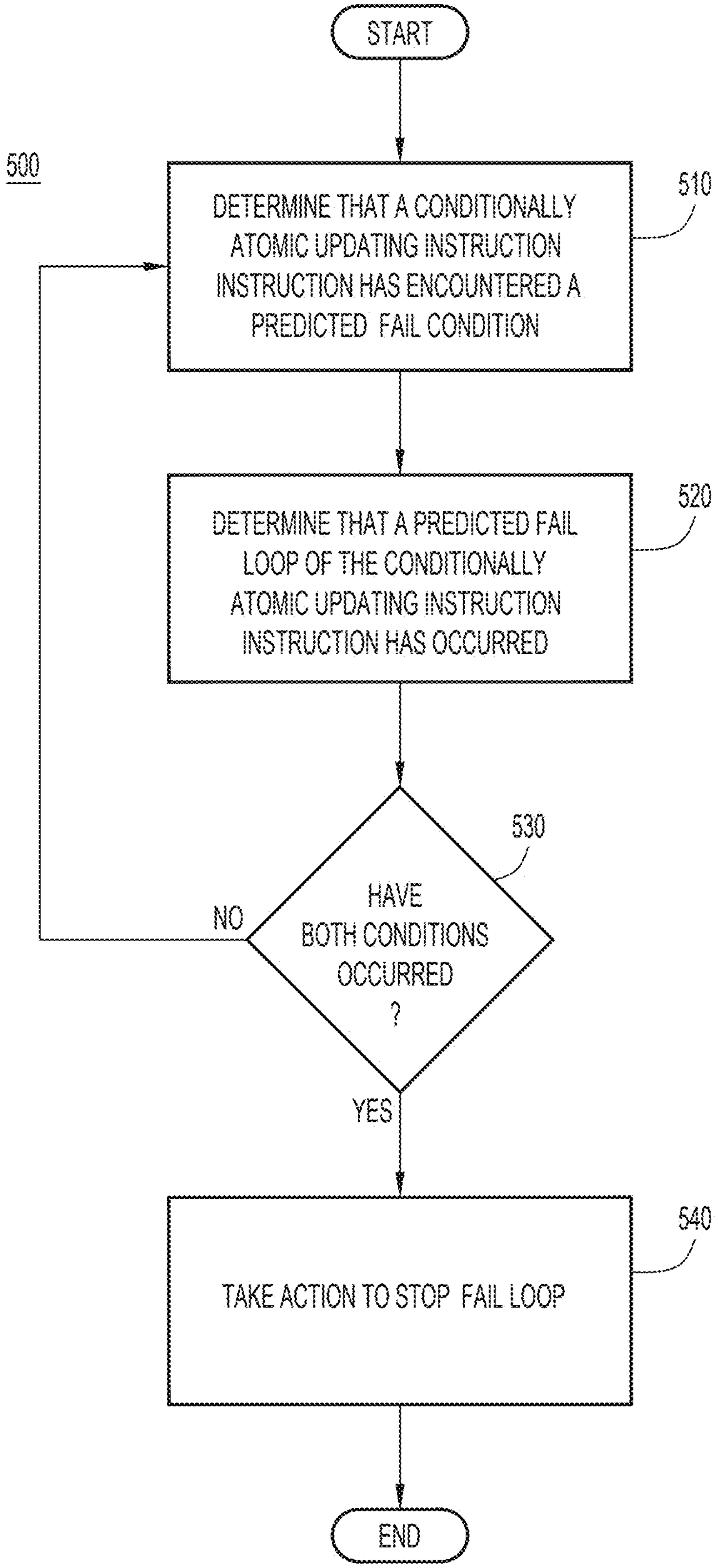
FIG. 5 is a flowchart of a method for responding to a conditionally atomic update instruction fail loop according to an embodiment of the present invention.

FIG. 5 is a flowchart of a method 500 for responding to a conditionally atomic update instruction fail loop according to an embodiment of the present invention.

A conditionally atomic update instruction (e.g., a CS instruction) is determined to have encountered a fail condition at operation 510. A fail condition is detected when a completing instruction is not actually storing, indicating that the instruction is a speculative store that is dropped when the condition for storing is not satisfied. Note that other embodiments may instead detect some attribute common to a superset of instructions including CS instruction but then specifically detect a failing CS instruction due to determining the instruction created a STQ entry but failed to store and a CS instruction is the only instruction that is capable of that behavior out of the superset of instructions. In this way, failing CS instructions are still accurately detected. Note that some embodiments may allow for some level of inaccuracy for detecting a failing CS instruction which may also be acceptable.

A predicted fail loop of the conditionally atomic update instruction is determined to be occurring at operation 520. A CS fail loop is predicted to be occurring after a failing CS condition has been observed and when subsequently an XI instruction is rejected only due to entries in an STQ that have not yet been removed from tracking due to detecting that the store that the entry tracks has not occurred (i.e., due to a speculative store failing).

Operation 530 determines that a conditionally atomic update instruction has been determined to have encountered a fail condition and that a predicted fail loop of the CS instruction is determined to be occurring. When both of these conditions are satisfied, method 500 may proceed to take actions to temporarily stop a CS fail loop at operation 540. Otherwise, method 500 may return to operation 510 to determine whether the conditions of operations 510 and 520 are satisfied as the instruction queue continues to be processed.

One or more actions are taken to temporarily stop a fail loop at operation 540. In some embodiments, a selfish store mitigation operation is performed, which blocks the thread or core responsible for the fail loop from inserting new instructions into the instruction pipeline, causing no new STQ entries to be created. The decision to perform the selfish store mitigation operation may be based on an XI rejection counter satisfying a threshold value. In order to more quickly raise the XI rejection counter, in some embodiments the count of each individual XI rejection is raised (e.g., doubled, tripled, etc.) when the conditions of operation 530 have been met. Additionally or alternatively, when these conditions are met, a rate of XI instruction attempts may be increased. In other embodiments, rather than preventing any instructions from being entered into the pipeline of the core or thread responsible for the fail loop, only conditionally atomic update instruction are blocked. Once the fail loop operation is temporarily stopped, the CS instruction or general instruction processing will be allowed to proceed again after an XI has been successfully processed without being rejected.

It will be appreciated that the embodiments described above and illustrated in the drawings represent only a few of the many ways of implementing embodiments for improved responsiveness when looping on speculative atomic memory updates.

The environment of the present invention embodiments may include any number of computer or other processing systems (e.g., any computing device, computing service, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system. These systems may include any types of monitors and input devices (e.g., keyboard, mouse, voice recognition, etc.) to enter and/or view information.

It is to be understood that the software of the present invention embodiments (e.g., application code 200, application(s) 302, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client, distributed computing, and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the computing system. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., application data, data processed by multiprocessing computing environment 300, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The application data, data processed by multiprocessing computing environment 300, and/or any other data may include any information arranged in any fashion, and may be configurable based on rules or other criteria to provide desired information to a user.

The present invention embodiments are not limited to the specific tasks or algorithms described above, but may be utilized for improving execution of atomic instructions in a multiprocessing computing system.

The data may include any format of storing data and may include any data descriptive of databases, including metadata and indexes thereof. The data may be obtained via any techniques, and may be accessed over a network, fetched from local storage, provided via user input, and the like.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises”, “comprising”, “includes”, “including”, “has”, “have”, “having”, “with” and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

determining that a conditionally atomic updating instruction has encountered a fail condition;

determining that a fail loop of the conditionally atomic updating instruction has occurred;

in response to determining that the conditionally atomic updating instruction has encountered the fail condition and that the fail loop has occurred, increasing a count that each cross-interrogation request (XI) instruction rejection contributes toward an XI rejection count that is compared to a threshold; and in response to the XI rejection count satisfying the threshold, performing a selfish store mitigation operation, wherein the selfish store mitigation operation blocks a thread or core responsible for the fail loop from inserting a new instruction into an instruction pipeline and flushes non-completed instructions of the thread or core from the instruction pipeline, wherein in response to determining that the conditionally atomic updating instruction has encountered the fail condition and that the fail loop has occurred, a retry rate of each rejected XI instruction is increased.

2. The computer-implemented method of claim 1, wherein increasing the count for each XI request comprises doubling the count.

3. The computer-implemented method of claim 1, wherein determining that the conditionally atomic updating instruction has encountered the fail condition comprises:

determining that the conditionally atomic updating instruction is in the instruction pipeline; and determining that a condition of the conditionally atomic updating instruction for storing has not been satisfied.

4. The computer-implemented method of claim 1, wherein determining that the fail loop of the conditionally atomic updating instruction has occurred comprises:

determining that an XI request has been rejected based on one or more stores in a store queue that have not yet been removed from tracking due to determining that a condition of the conditionally atomic updating instruction has not been satisfied for storing.

5. The computer-implemented method of claim 4, wherein a subsequent XI request is rejected based on determining that the one or more stores are present in the store queue.

6. The computer-implemented method of claim 1, wherein the new instruction that the selfish store mitigation operation blocks from inserting into the instruction pipeline comprises a new conditionally atomic updating instruction.

7. A computer system comprising:

a processor set;

one or more computer-readable storage media; and program instructions stored on the one or more computer-readable storage media to cause the processor set to perform operations comprising:

determining that a conditionally atomic updating instruction has encountered a fail condition;

determining that a fail loop of the conditionally atomic updating instruction has occurred;

in response to determining that the conditionally atomic updating instruction has encountered the fail condition and that the fail loop has occurred, increasing a count that each cross-interrogation request instruction rejection contributes toward an XI rejection count that is compared to a threshold; and in response to the XI rejection count satisfying the threshold, performing a selfish store mitigation operation, wherein the selfish store mitigation operation blocks a thread or core responsible for the fail loop from inserting a new instruction into an instruction pipeline and flushes non-completed instructions of the thread or core from the instruction pipeline, wherein in response to determining that the conditionally atomic updating instruction has encountered the fail condition and that the fail loop has occurred, a retry rate of each rejected XI instruction is increased.

8. The computer system of claim 7, wherein increasing the count for each XI request comprises doubling the count.

9. The computer system of claim 7, wherein determining that the conditionally atomic updating instruction has encountered the fail condition comprises:

determining that the conditionally atomic updating instruction is in the instruction pipeline; and determining that a condition of the conditionally atomic updating instruction for storing has not been satisfied.

10. The computer system of claim 7, wherein determining that the fail loop of the conditionally atomic updating instruction has occurred comprises:

determining that an XI request has been rejected based on one or more stores in a store queue that have not yet been removed from tracking due to determining that a condition of the conditionally atomic updating instruction has not been satisfied for storing.

11. The computer system of claim 10, wherein a subsequent XI request is rejected based on determining that the one or more stores are present in the store queue.

12. The computer system of claim 7, wherein the new instruction that the selfish store mitigation operation blocks from inserting into the instruction pipeline comprises a new conditionally atomic updating instruction.

13. A method comprising:

determining that a conditionally atomic updating instruction has encountered a fail condition;

determining that a fail loop of the conditionally atomic updating instruction has occurred;

in response to determining that the conditionally atomic updating instruction has encountered the fail condition and that the fail loop has occurred, increasing a retry rate of each rejected XI instruction, wherein each XI instruction rejection contributes toward an XI rejection count that is compared to a threshold; and in response to the XI rejection count satisfying the threshold, performing a selfish store mitigation operation, wherein the selfish store mitigation operation blocks a thread or core responsible for the fail loop from inserting a new instruction into an instruction pipeline and flushes non-completed instructions of the thread or core from the instruction pipeline, wherein in response to determining that the conditionally atomic updating instruction has encountered the fail condition and that the fail loop has occurred, a retry rate of each rejected XI instruction is increased.

14. The method of claim 13, wherein increasing the count for each XI request comprises doubling the count.

15. The method of claim 13, wherein determining that the conditionally atomic updating instruction has encountered the fail condition comprises:

determining that the conditionally atomic updating instruction is in the instruction pipeline; and determining that a condition of the conditionally atomic updating instruction for storing has not been satisfied.

16. The method of claim 13, wherein determining that the fail loop of the conditionally atomic updating instruction has occurred comprises:

determining that an XI request has been rejected based on one or more stores in a store queue that have not yet been removed from tracking due to determining that a condition of the conditionally atomic updating instruction has not been satisfied for storing.

17. The method of claim 16, wherein a subsequent XI request is rejected based on determining that the one or more stores are present in the store queue.

* * * * *